United States Patent [19]
Huskey

[11] Patent Number: 5,961,140
[45] Date of Patent: Oct. 5, 1999

[54] HITCH COVERING DEVICE

[76] Inventor: Lloyd W. Huskey, 10904 Corby Ave., Norwalk, Calif. 90650-1616

[21] Appl. No.: 08/916,310

[22] Filed: Aug. 22, 1997

[51] Int. Cl.[6] ....................................................... B60D 1/01
[52] U.S. Cl. ............................................ 280/507; 150/166
[58] Field of Search ..................................... 280/507, 424, 280/425.2, 433; 70/232, 258; 150/166

[56] References Cited

U.S. PATENT DOCUMENTS

| | | | |
|---|---|---|---|
| 3,526,110 | 9/1970 | Foote | 280/507 |
| 4,581,908 | 4/1986 | Bulle et al. | 280/507 |
| 5,037,122 | 8/1991 | Beckerer, Jr. | 280/507 |
| 5,255,545 | 10/1993 | Wheeler | 280/507 |
| 5,297,407 | 3/1994 | Tarr | 280/507 |
| 5,752,398 | 5/1998 | Villalon, Jr. | 280/507 |
| 5,791,677 | 8/1998 | Froehlich | 280/507 |

*Primary Examiner*—Daniel G. DePumpo

[57] ABSTRACT

A hitch covering device including an enclosure dimensioned for slidable coupling over a pin box of a trailer hitch. An extension member is coupled with respect to the enclosure for coupling over a king pin of the trailer hitch.

6 Claims, 2 Drawing Sheets

ND VIEW OF THE INVENTION

HITCH COVERING DEVICE

BACKGROUND OF THE INVENTION

1. Field of the Invention

The present invention relates to a hitch covering device and more particularly pertains to covering and protecting a pin box and kingpin of a trailer hitch with a hitch covering device.

2. Description of the Prior Art

The use of fifth wheel covers is known in the prior art. More specifically, fifth wheel covers heretofore devised and utilized for the purpose of covering a tractor bearing plate are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,165,713 to Picard discloses a fifth wheel cover. U.S. Pat. No. 5,058,914 to Murcheson discloses a fifth wheel slip cover. U.S. Pat. No. 4,852,902 to Young et al. discloses a towing hitch cover. U.S. Pat. No. 3,936,077 to Bliek discloses a tonneau cover for fifth wheel camper trucks. U.S. Pat. No. 4,955,968 to Beckerer, Jr. discloses a protective cover for a trailer hitch. U.S. Pat. No. 4,285,138 to Berry discloses a trailer hitch visual alignment device.

While these devices fulfill their respective, particular objective and requirements, the aforementioned patents do not describe a hitch covering device for covering and protecting a pin box and kingpin of a trailer hitch.

In this respect, the hitch covering device according to the present invention substantially departs from the conventional concepts and designs of the prior art, and in doing so provides an apparatus primarily developed for the purpose of covering and protecting a pin box and kingpin of a trailer hitch.

Therefore, it can be appreciated that there exists a continuing need for new and improved hitch covering device which can be used for covering and protecting a pin box and kingpin of a trailer hitch. In this regard, the present invention substantially fulfills this need.

SUMMARY OF THE INVENTION

In the view of the foregoing disadvantages inherent in the known types of fifth wheel covers now present in the prior art, the present invention provides an improved hitch covering device. As such, the general purpose of the present invention, which will be described subsequently in greater detail, is to provide a new and improved hitch covering device and method which has all the advantages of the prior art and none of the disadvantages.

To attain this, the present invention essentially comprises an enclosure dimensioned for slidable coupling over a pin box of a trailer hitch. The enclosure has a generally rectangular configuration. The enclosure has an open top, a bottom, an open forward end, a closed rearward end and a pair of long side walls. The bottom has and opening extending from the open forward end to a position closer to the closed rearward end than the open forward end. The enclosure further includes a rim member having a generally U-shaped configuration. The rim member is coupled with upper edges of the closed rearward end and the pair of long side walls. The rim member has a width of about 20% of a width of the bottom. An extension member is coupled with respect to the enclosure for coupling over a king pin of the trailer hitch. The extension member has a generally square configuration. The extension member has an open top, a closed bottom, an open forward end, a closed rearward end and a pair of side walls. Upper edges of the closed rearward end and the pair of side walls are coupled with the recess.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved hitch covering device which has all the advantages of the prior art fifth wheel covers and none of the disadvantages.

It is another object of the present invention to provide a new and improved hitch covering device which may be easily and efficiently manufactured and marketed.

It is a further object of the present invention to provide a new and improved hitch covering device which is of durable and reliable construction.

An even further object of the present invention is to provide a new and improved hitch covering device which is susceptible of a low cost of manufacture with regard to both materials and labor, and which accordingly is then susceptible of low prices of sale to the consuming public, thereby making such a hitch covering device economically available to the buying public.

Even still another object of the present invention is to provide a new and improved hitch covering device for covering and protecting a pin box and kingpin of a trailer hitch.

Lastly, it is an object of the present invention to provide a new and improved hitch covering device including an enclosure dimensioned for slidable coupling over a pin box of a trailer hitch. An extension member is coupled with respect to the enclosure for coupling over a king pin of the trailer hitch.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
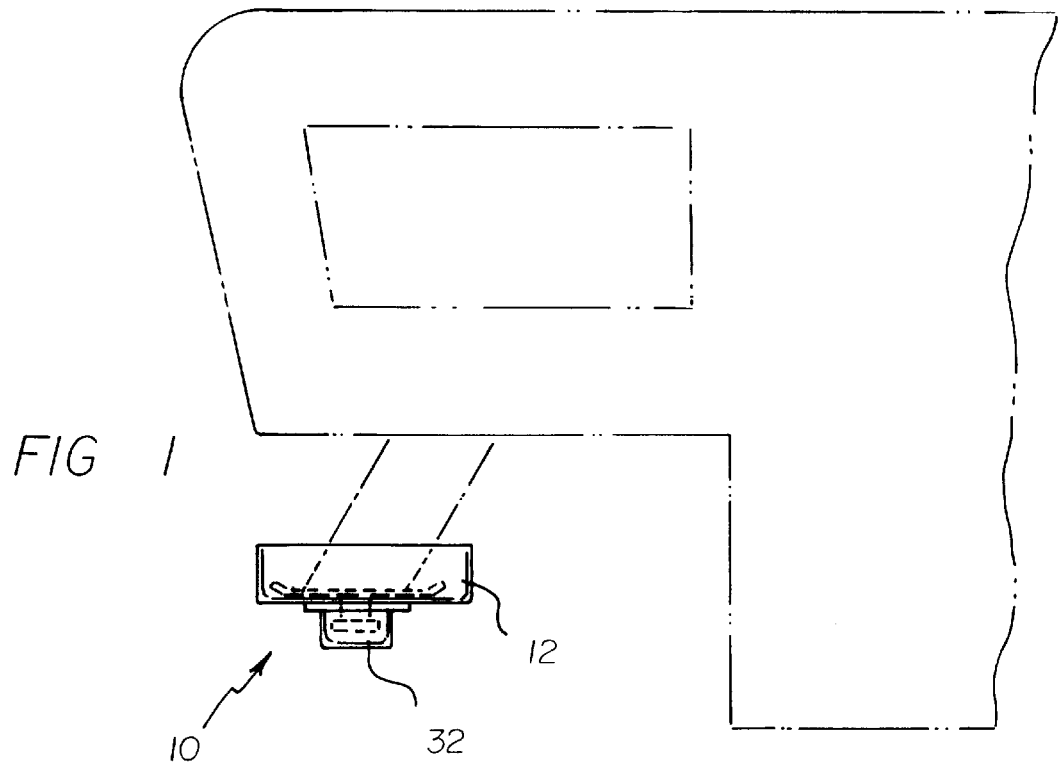
FIG. 1 is a side view of the preferred embodiment of the hitch covering device constructed in accordance with the principles of the present invention.
Figure 2:
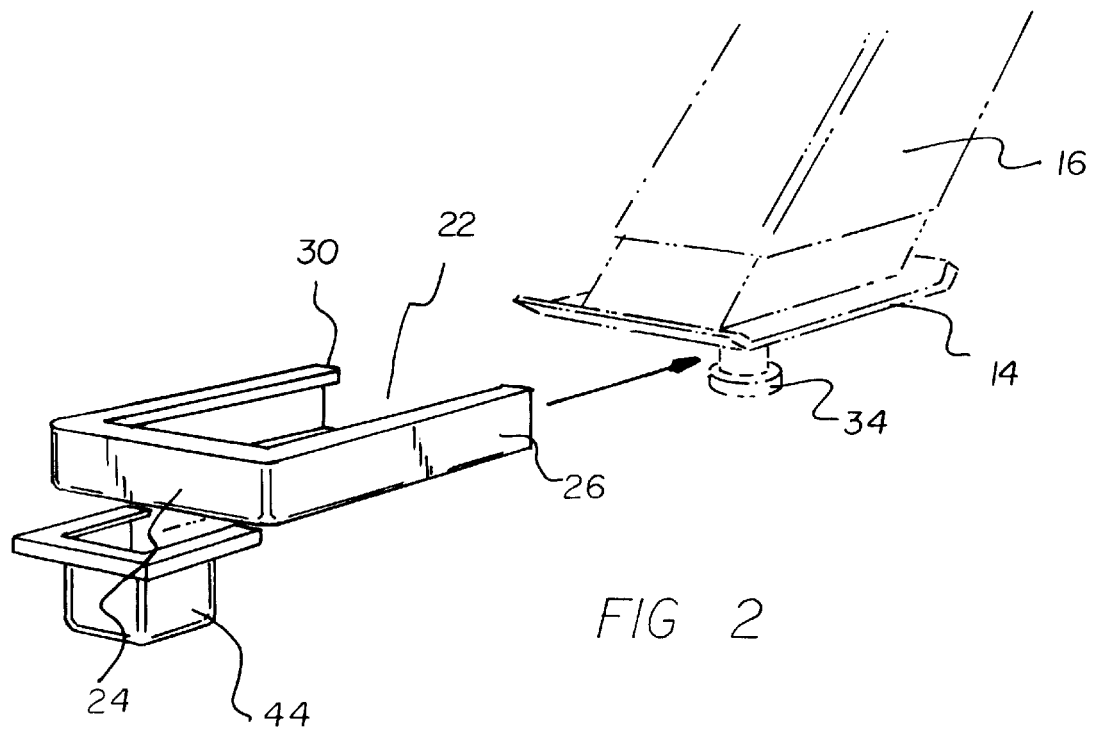
FIG. 2 is a perspective, view of the present invention shown removed from the trailer hitch.
Figure 3:
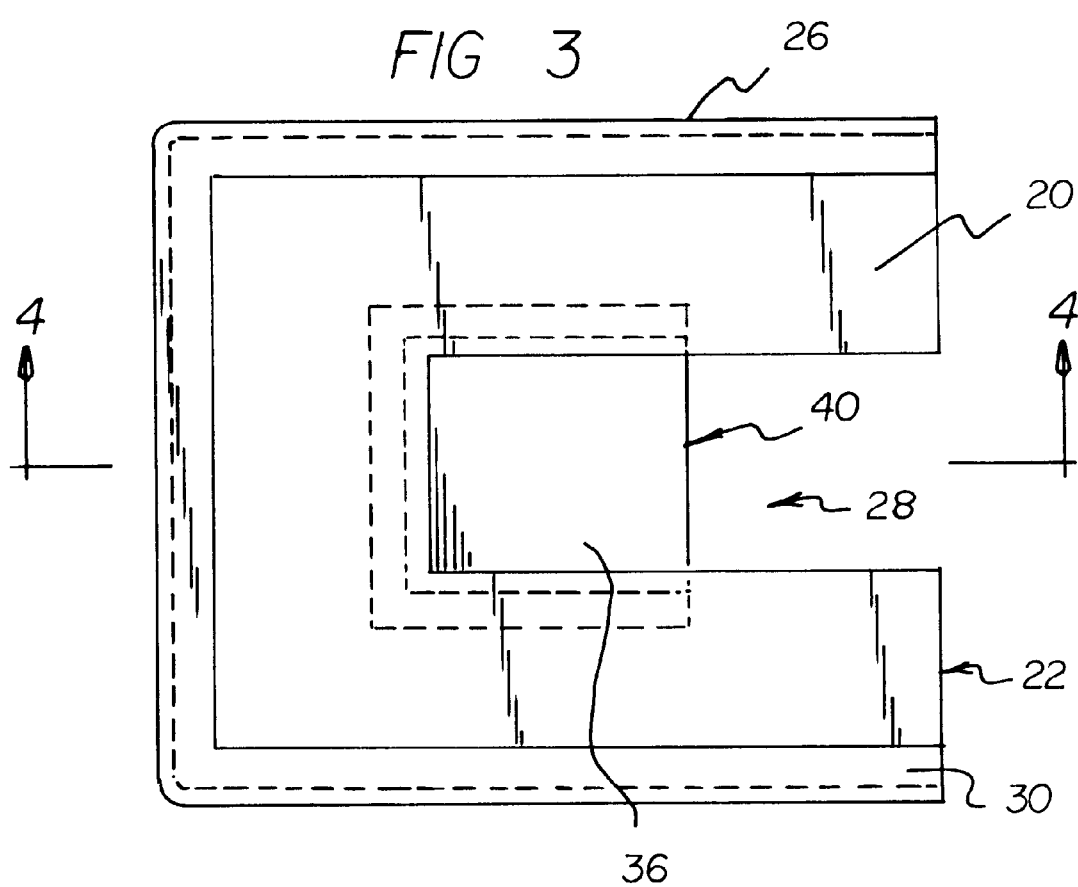
FIG. 3 is a top plan view of the present invention.
Figure 4:
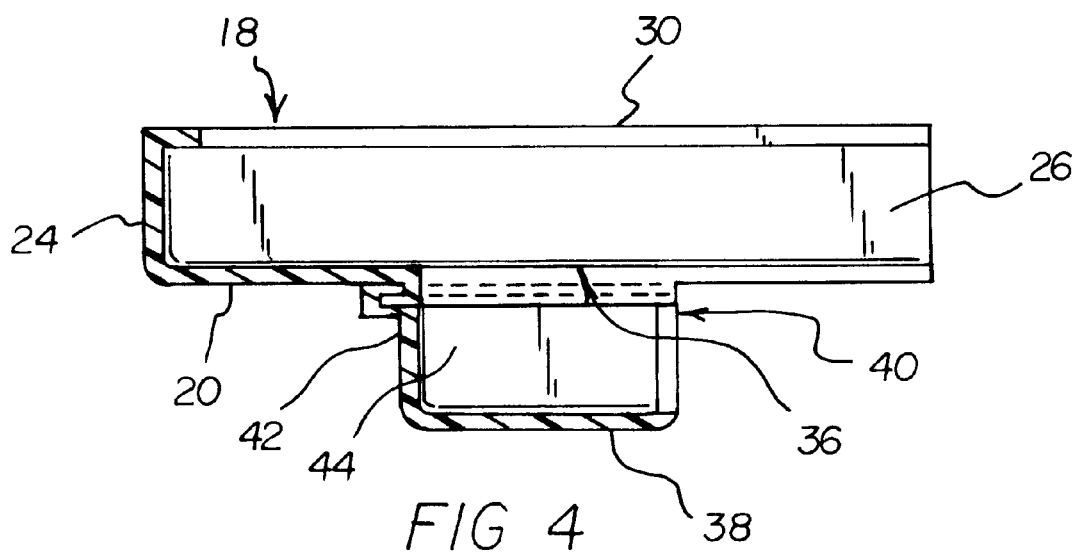
FIG. 4 is a cross-sectional view as taken along line 4—4 of FIG. 3.

With reference now to the drawings, and in particular, to FIGS. 1 through 4 thereof, the preferred embodiment of the new and improved hitch covering device embodying the principles and concepts of the present invention and generally designated by the reference number 10 will be described.

Specifically, it will be noted in the various Figures that the device relates to a hitch covering device for covering and protecting a pin box and kingpin of a trailer hitch. In its broadest context, the device consists of an enclosure and an extension member. Such components are individually configured and correlated with respect to each other so as to attain the desired objective.

The enclosure 12 is dimensioned for slidable coupling over a pin box 14 of a trailer hitch 16. The enclosure 12 has a generally rectangular configuration. The enclosure 12 has an open top 18, a bottom 20, an open forward end 22, a closed rearward end 24 and a pair of long side walls 26. The bottom 20 has an opening 28 extending from the open forward end 22 to a position closer to the closed rearward end 24 than the open forward end 22. The enclosure 12 further includes a rim member 30 having a generally U-shaped configuration. The rim member 30 is coupled with upper edges of the closer rearward end 24 and the pair of long side walls 26. The rim member 30 has a width of about 20% of a width of the bottom 20. The enclosure 12 able to slide over the pin box 14 which is planar and has upturned end portions. Note FIGS. 1 and 2. The rim member 30 will rest atop the pin box 14, as in FIG. 1, to couple the enclosure 12 therewith. The opening 28 allows for a king pin 34 to be cleared by the enclosure 12 upon insertion onto the pin box 14. The closed rearward end 24 will preclude the enclosure 12 from sliding too far with respect to the pin box 14.

The extension member 32 is coupled with respect to the enclosure 12 for coupling over the king pin 34 of the trailer hitch 16. The extension member 32 has a generally square configuration. The extension member 32 has an open top 36, a closed bottom 38, an open forward end 40, a closed rearward end 42 and a pair of side walls 44. Upper edges of the closed rearward end 42 and the pair of side walls 44 are coupled with the recess 28. The extension member 32 is about 50% of a depth of the recess 28. Once the enclosure 12 is positioned on the pin box 14, the extension member 32 will cover the king pin 34 to preclude contact with the king pin which is usually dirty with grease and a dangerous hard surface when contacted, particularly by children.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A hitch covering device for covering and protecting a pin box and kingpin of a trailer hitch comprising, in combination:

an enclosure dimensioned for slidable coupling over a pin box of a trailer hitch, the enclosure having a generally rectangular configuration, the enclosure having an open top, a bottom, an open forward end, a closed rearward end and a pair of long side walls, the bottom having an opening extending from the open forward end to a position closer to the closed rearward end that the open forward end, the enclosure further including a rim member having a generally U-shaped configuration, the rim member coupled with upper edges of the closed rearward end and the pair of long side walls, the rim member having a width of about 20% of a width of the bottom; and an extension member coupled with respect to the enclosure for coupling over a king pin of the trailer hitch, the extension member having a generally square configuration, the extension member having an open top, a closed bottom, an open forward end, a closed rearward end and a pair of side walls, upper edges of the closed rearward end and the pair of side walls coupled with the opening.

2. A hitch covering device for covering and protecting a pin box and kingpin of a trailer hitch comprising, in combination:

an enclosure dimensioned for slidable coupling over a pin box of a trailer hitch, the enclosure having a generally rectangular configuration, the enclosure further having an open top, a bottom, an open forward end, a closed rearward end and a pair of long side walls, the bottom having an opening extending from the open forward end to a position closer to the closed rearward end than the open forward end; and an extension member coupled with respect to the enclosure for coupling over a king pin of the trailer hitch.

3. The hitch covering device as set forth in claim 2 wherein the enclosure further including a rim member having a generally U-shaped configuration, the rim member coupled with upper edges of the closer rearward end and the pair of long side walls.

4. The hitch covering device as set forth in claim 3 wherein the rim member has a width of thereof about 20% of a width of the closed bottom.

5. A hitch covering device for covering and protecting a pin box and kingpin of a trailer hitch comprising, in combination:

an enclosure dimensioned for slidable coupling over a pin box of a trailer hitch, the enclosure having a generally rectangular configuration, the enclosure further having an open top, a bottom, an open forward end, a closed rearward end and a pair of long side walls, the bottom having an opening extending from the open forward end to a position closer to the closed rearward end than the open forward end; and an extension member coupled with respect to the enclosure for coupling over a king pin of the trailer hitch, the extension member having a generally square configuration, the extension member further having an open top, a closed bottom, an open forward end, a closed rearward end and a pair of side walls, the upper edges of the closed rearward end and the pair of side walls coupled with the enclosure.

6. The hitch covering device as set forth in claim 5 wherein the extension member being about 33% of a depth of the enclosure.

\* \* \* \* \*